United States Patent

Kuze

Patent Number: 5,119,061
Date of Patent: Jun. 2, 1992

[54] THERMO-ACTUATOR

[76] Inventor: Yoshikazu Kuze, 31-3, Higashimagome 1-chome, Ohta-ku, Tokyo, Japan

[21] Appl. No.: 787,077

[22] Filed: Nov. 4, 1991

[30] Foreign Application Priority Data

Nov. 5, 1990 [JP] Japan .................. 2-297152

[51] Int. Cl.⁵ .................. H01H 37/46; F01P 7/02
[52] U.S. Cl. .................. 337/393; 236/34.5; 236/100; 374/160; 361/387
[58] Field of Search .................. 337/393, 298, 401, 402; 236/100, 34, 34.5; 251/175; 374/187; 361/387; 60/527

[56] References Cited

U.S. PATENT DOCUMENTS 4,948,043 8/1990 Kuze .................. 236/100

*Primary Examiner*—Harold Broome
*Attorney, Agent, or Firm*—Beveridge, DeGrandi & Weilacher

[57] ABSTRACT

A guide member is slidably mounted on a rod, a resilient seal bag is provided around a first end portion of the rod and secured to the guide member, and a tubular sealing member is slidably mounted on a second end portion of the rod. The rod is inserted in a heat conductive cylinder secured to the guide member, and wax is provided in the heat conductive cylinder. The seal bag has a base portion and a bag portion, and is engaged with the rod only at the base portion to form a gap between the bag portion and the rod. The gap is charged with lubricating oil. The sealing member has a tubular body, a skirt portion, a closed head portion, and a plurality of annular grooves formed in an inner wall of the body. The base portion is secured to the guide member, and the head portion is engaged with an end of the second end portion of the rod.

4 Claims, 4 Drawing Sheets

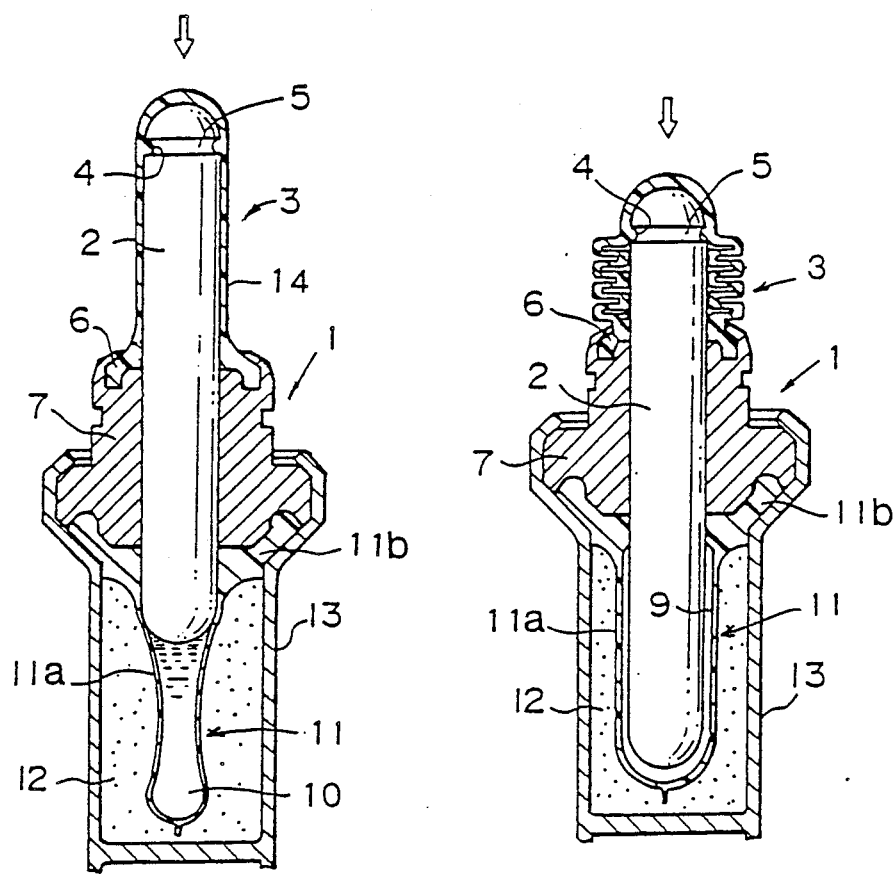

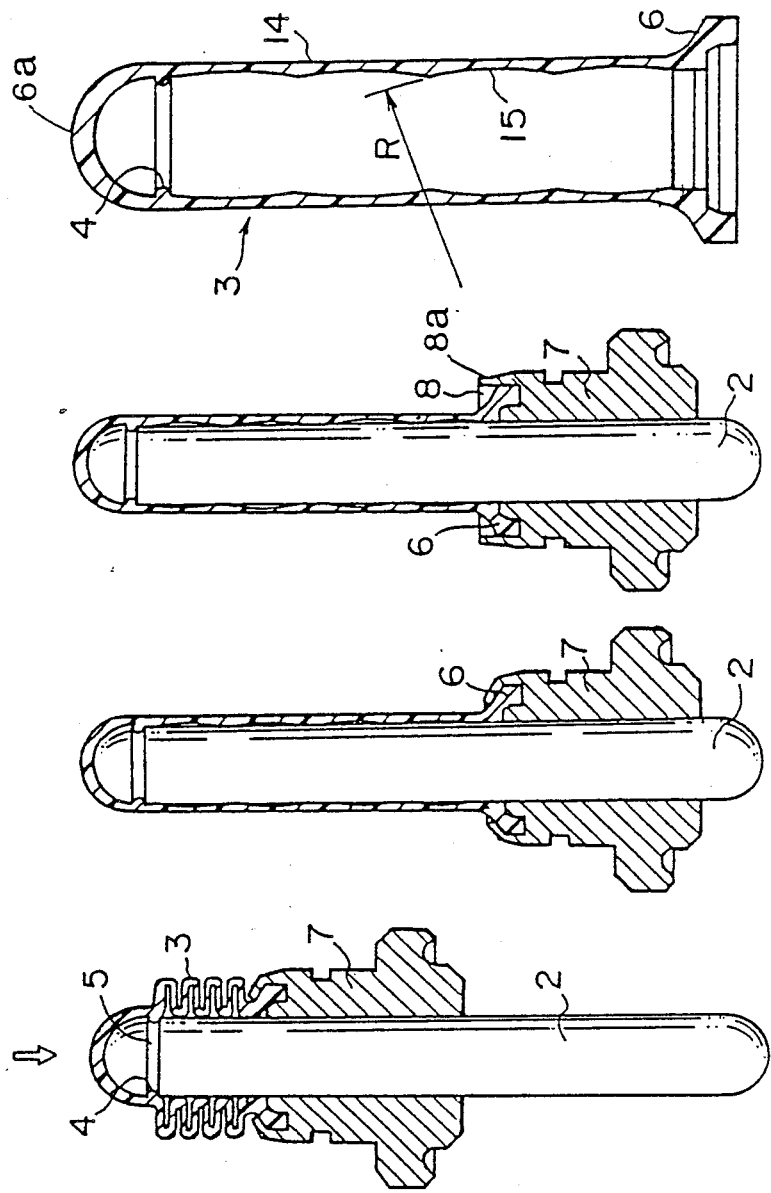

THERMO-ACTUATOR

BACKGROUND OF THE INVENTION

The present invention relates to a thermo-actuator, and more particularly to a thermo-actuator provided in a wax-pellet thermostat for a cooling system of an automotive engine and for various thermo-sensors.

The thermo-actuator in the wax-pellet thermostat includes a steel rod secured to a housing at an end thereof, a guide member slidably mounted on the rod, a seal spool secured to the guide member and provided around the rod, a heat conductive cylinder secured to the guide member and exposed to a coolant, a wax provided in the cylinder, and a spring urging the guide member towards the end of the rod.

When the temperature of the coolant rises in excess of a predetermined value of the thermostat, the wax expands. This forces the seal spool against the steel rod. As the wax squeezes the seal spool around the rod, the cylinder moves outwardly together with the guide member against the spring to open a main valve to pass the coolant to a radiator, thereby lowering the temperature of the coolant. When the thermostat cools, the wax contracts, so that the seal spool expands, and the cylinder is moved to the end of the rod by the spring to close the valve. In order to seal a sliding portion of the guide member, a dynamic seal such as a packing is provided. However, the coolant includes fine molding sands, fine particles of rusted iron, oil and other particles which form a sludge with antifreeze mixture. Therefore, the conventional seal is liable to be deteriorated because of severe circumstances.

On the other hand, in an ordinary thermostat having a valve open lift of 10 mm, the pressure of the wax for lifting the valve becomes high as 140 kg/cm$^2$. To resist the high pressure and to ensure the durability, the seal spool is made to have a large thickness, for example 45% of the diameter of the rod. Therefore, in order to compress and deform the thicken and stiff seal spool, a large force of 38 kg/cm$^2$ for 140 kg/cm$^2$ is consumed. In addition, there probably occur troubles, such as wear and tear of the seal spool, and sticking of the spool to the rod, because of large friction.

SUMMARY OF THE INVENTION

An object of the present invention is to provide a thermo-actuator having a sealing means with high durability, and having a seal bag having a small thickness engaged with a rod at an end portion thereof, thereby preventing lubricating oil from leaking.

Another object of the present invention is to provide a thermo-actuator where a resilient seal bag provided around a rod has a very small thickness, thereby reducing the size and weight of the thermo-actuator and elongating the life time of the thermo-actuator.

According to the present invention, there is provided a thermo-actuator having an actuating rod, a guide member slidably mounted on the actuating rod, a resilient seal bag provided around a first end of the rod and hermetically secured to the guide member, a heat conductive cylinder housing the seal bag and the rod and secured to the guide member, and wax provided in the heat conductive cylinder to enclose the seal bag.

The seal bag has a base portion and a bag portion defining a hollow, and is engaged with the rod only at the base portion to form a gap between the bag portion and the rod, and the gap is charged with lubricating oil.

The bag portion has a thickness between 25% and 1% of the diameter of the rod, so that the pressure of the lubricating oil is built up to a value equivalent to the pressure of the wax, thereby holding the bag portion in a floating state.

The thermo-actuator further has a tubular sealing member made of rubber, which comprises a tubular body having a straight tubular form in a free condition, a skirt portion, a head portion, and a plurality of annular portions, the cross sectional thickness of each annular portion in the radial direction being different from that of the tubular body.

The tubular body is slidably mounted on a second end portion of the rod, the skirt portion is secured to the guide member, and the head portion is secured to the rod at an end of the second end portion of the rod. The annular portion is so designed that the tubular body is automatically wrinkled to be contracted in the form of a bellows from the straight tubular form when the guide member is moved to the end of the rod.

When the wax expands with an increase of ambient temperature, the pressure of the lubricating oil equivalent to the pressure causes the rod to raise.

At an early stage of the expansion of the wax, a part of the bag portion adjacent to the base portion is contracted the first to squeeze the rod, so that the lubricating oil in the seal bag is prevented from leaking. Since the bag portion is in a floating state between the wax and the lubricating oil, the bag portion does not participate in lifting the rod. Therefore, the thickness of the seal bag can be reduced, and the life time of the seal bag is elongated. Because of the thin thickness of the seal bag, the diameter of the heat conductive cylinder can be reduced, and the diameter of the rod can be increased.

On the other hand, the pressure of the wax necessary for lifting the rod decreases in reverse proportion to the square to the diameter of the rod. Consequently, the pressure of the wax and hence the pressure of the lubricating oil reduce largely with the increase of the diameter of the rod. Therefore, the life time of the seal bag can be further increased.

When the ambient temperature decreases, the wax contracts, so that the rod is retracted by a spring. At that time, the tubular body is automatically wrinkled at the annular grooves to form a bellows.

These and other objects and features of the present invention will become more apparent from the following detailed description with reference to the accompanying drawings.

BRIEF DESCRIPTION OF DRAWINGS

FIG. 1 is a sectional view of a thermo-actuator for a thermostat according to the present invention in a rod retracting state;

FIG. 2 is a sectional view of the thermo-actuator in a rod projecting state;

FIG. 3 is a sectional side view of a tubular sealing member;

FIGS. 4 and 5 are sectional views of the seal bag for explaining the mounting of the tubular sealing member to a guide member;

FIG. 6 is a sectional view showing formation of a bellows; and

DETAILED DESCRIPTION OF THE PREFERRED EMBODIMENT

Figure 7:
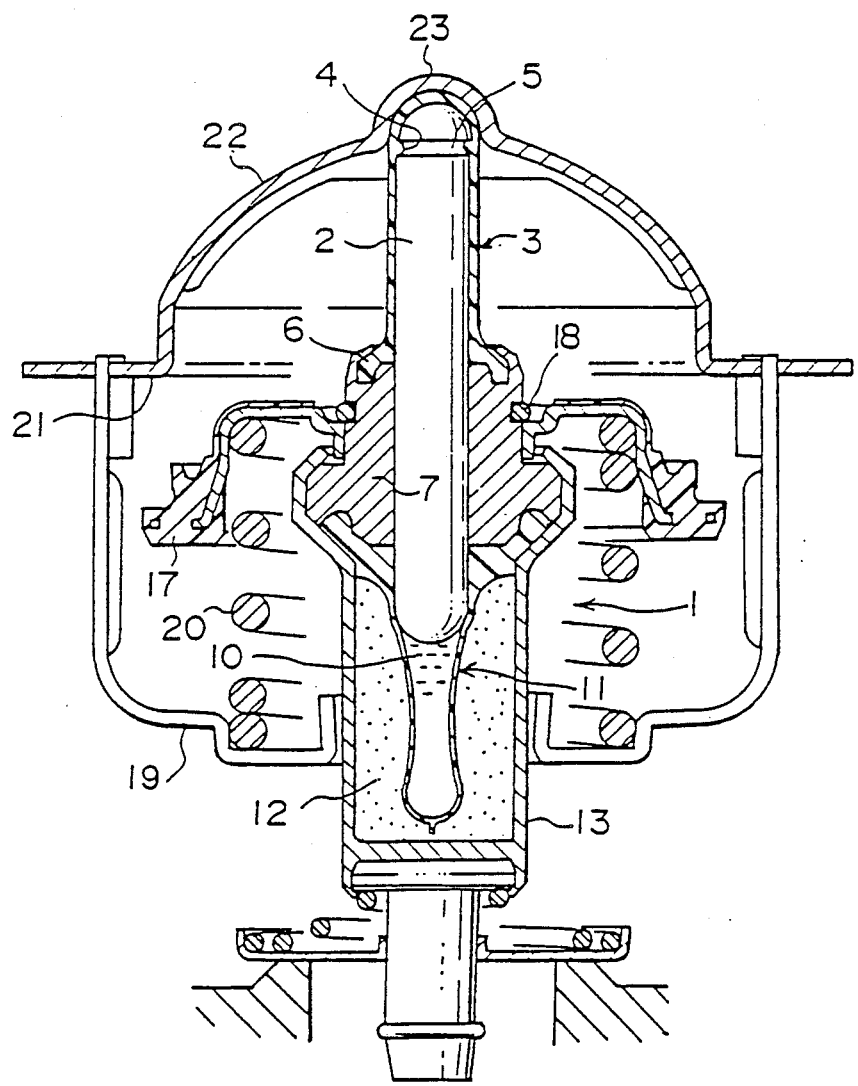
FIG. 7 and 8 are sectional views of a thermostat provided with the thermo-actuator of the present invention.

Referring to FIGS. 1 and 2 showing a thermo-increase actuator of the present invention, the thermo-actuator 1 comprises an actuating steel rod 2, a guide member 7 slidably mounted on the rod 2, a tubular sealing member 3 made of rubber, and a resilient seal bag 11 which are hermetically secured to the guide member 7. The seal bag 11 is mounted on one of the end portions of the rod 2.

Referring to FIG. 3 showing a tubular sealing member 3, the tubular sealing member 3 is adapted to automatically form a bellows when compressed.

The tubular sealing member 3 comprises a tubular body 14 having a straight tubular form in a free condition. The tubular body 14 has a skirt portion 6, a head portion 6a, and a plurality of annular grooves 15 circumferentially formed in an inner wall thereof. The annular groove 15 is formed to have a curvature in section having a large radius R. An annular rib 4 is formed on the inside wall of the head portion 6a.

Referring to FIGS. 4 and 5, the sealing member 3 is slidably mounted on the other end portion of the steel rod 2 at the tubular body 14 thereof. The inside of the closed head portion 6a of the sealing member 3 is engaged with the top end of the steel rod 2 and the annular rib 4 is engaged with an annular groove 5 formed in an end portion of the rod 2. The skirt portion 6 is mounted in a seal pocket 8 formed on the guide member 7. An outer periphery 8a of the seal pocket 8 is inwardly bent at a predetermined hydraulic pressure so that the sealing member 3 is secured to the guide member 7 with a sealing effect.

Referring back to FIG. 1, the seal bag 11 is inserted in a heat conductive cylinder 13 filled with wax pellet 12. An upper end of the cylinder 13 is securely engaged with the guide member 7, thereby forming the thermo-actuator 1.

The seal bag 11 comprises a bag portion 11a and a base portion 11b. The seal bag 11 engages with the rod 2 only at the base portion 11b with a gap 9 between the bag portion 11a and the rod 2. The gap 9 is filled with lubricating oil 10. The thickness of the bag portion 11a is reduced to a very small value. The thickness, for example, is between 25% and 1% of the diameter of the rod. The gap 9 has a predetermined width approximately equal to the thickness of the seal bag 11.

When the wax 12 expands with an increase of ambient temperature, the pressure of the lubricating oil 10 increases to a value equivalent to the pressure of the wax. The pressure of the lubricating oil acts to raise the rod 2 accordingly. FIG. 2 shows the condition where the rod 2 is raised to a maximum lift position. In accordance with the present invention, the rod is lifted by the pressure of the lubricating oil 10, and hence the bag portion 11a is in a floating state between the wax 12 and the lubricating oil 10 which are balanced in pressure. Therefore, the bag portion 11a does not participate in lifting the rod 2.

At an early stage of the expansion of the wax 12, a part of the bag portion 11a adjacent to the base portion 11b is contracted the first to squeeze the rod, so that the lubricating oil 10 in the seal bag 11 is prevented from leaking.

When the ambient temperature decreases, the wax 12 contracts. Accordingly, the rod 2 is lowered by a resilient force of a spring (not shown) to the initial position of FIG. 1.

At that time, the tubular body 14 is automatically wrinkled thanks of the annular grooves 15 to form a bellows in which wrinkled portions are contracted with each other, so that the length of the sealing member is largely reduced as shown in FIG. 1.

FIG. 7 shows the thermostat having the thermo-actuator of the present invention, which is provided for a cooling system of an automotive engine.

The thermostat has a housing 22 secured to a wall of a coolant passage of the engine, and a frame 19 secured to the housing 22. The housing 22 has a valve seat 21. The steel rod 2 of the thermo-actuator of the present invention is secured to the housing 22 at a top portion 23, and a primary valve 17 is secured to the guide member 7 by a snap ring 18. A return coil spring 20 disposed surrounding the cylinder 13 is provided between the primary valve 17 and the bottom of the frame 19.

Figure 8:
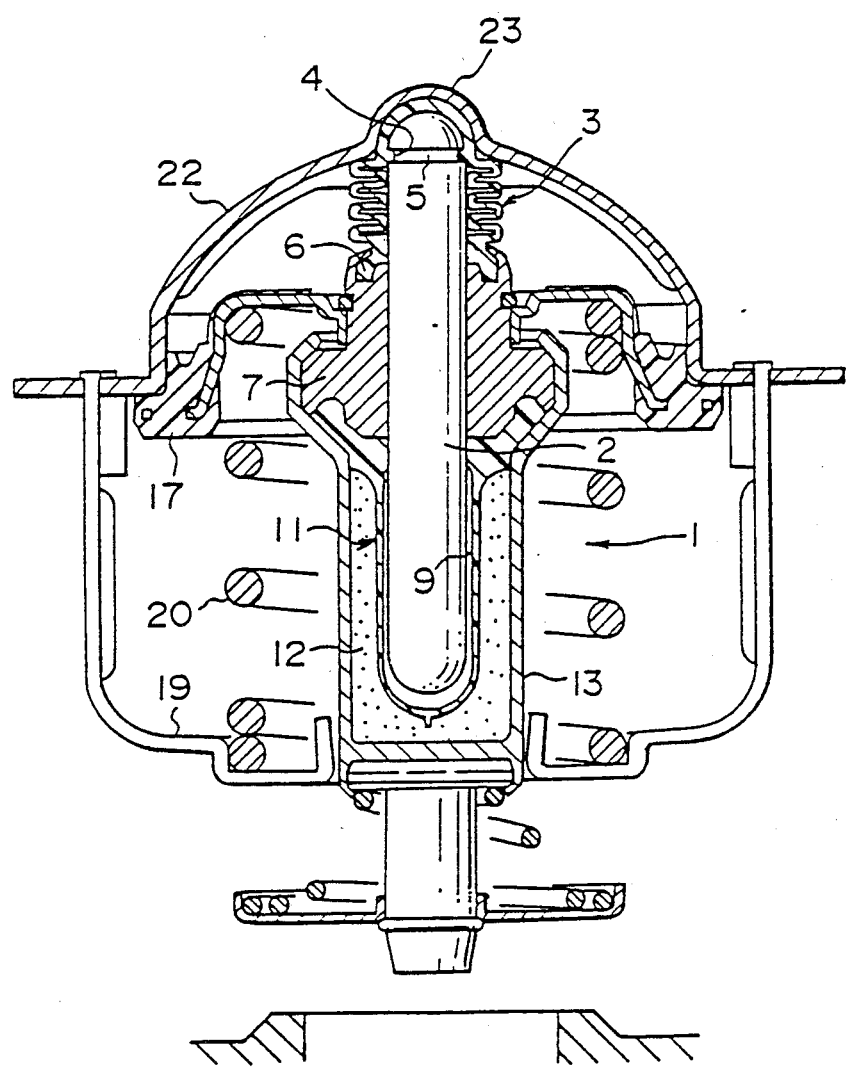

FIG. 8 shows the valve in the closed state. When the temperature of the coolant rises in excess of a predetermined value of the thermostat, the expansion of the wax 12 causes the pressure of the lubricating oil 10 to increase up to a value equivalent to the pressure of the wax 12. Since the thickness of the seal bag 11 is very small, a base portion of the bag grips the rod 2, so that the lubricating oil is prevented from leaking. The pressure of the lubricating oil is exerted on the rod 2 to urge it upwardly. Because the rod 2 is secured, the cylinder 13 of the thermo-actuator is downwardly moved against the force of the spring 20, thereby opening the primary valve 17 as shown in FIG. 7.

When the coolant temperature decreases, the wax 12 contracts. Thus, the coil spring 20 causes the valve 17 to raise to the closed position as shown in FIG. 8.

In accordance with the present invention, the resilient seal bag does not participate in moving the rod. Therefore, the thickness of the seal bag can be remarkably reduced, and the life time of the seal bag is very elongated. Because of the very thin thickness of the seal bag, the diameter of the heat conductive cylinder can be reduced. The more the diameter of the cylinder becomes small, the more the strength of the cylinder increases. As a result, the thickness of the wall of the cylinder can be reduced, which causes an increase of thermo-sensitivity and reduction of the thermo-actuator in size and weight. To the contrary, the diameter of the rod can be increased.

Since the tubular sealing member is mounted on the steel rod for sealing the steel rod, the introducing of the coolant and foreign materials through the sliding portion between the steel rod and the guide member is prevented.

The tubular sealing member is compressed from the straight tubular form to the bellows, so that a large stroke can be obtained with a member having a small length. Thus, the thermo-actuator can be made into a small size.

While the invention has been described in conjunction with preferred specific embodiment thereof, it will be understood that this description is intended to illustrate and not limit the scope of the invention, which is defined by the following claims.

What is claimed is:

1. A thermo-actuator having an actuating rod, a guide member slidably mounted on the actuating rod, a resilient seal bag provided around a first end portion of the rod and hermetically secured to the guide member, a heat conductive cylinder housing the seal bag and the rod and secured to the guide member, and wax provided in the heat conductive cylinder to enclose the seal bag, the improvement comprising:

the seal bag having a base portion, and a bag portion defining a hollow, and being engaged with the rod only at the base portion to form a gap having a predetermined width between the bag portion and the rod;

the gap being charged with lubricating oil;

the bag portion having a thickness between 25% and 1% of the diameter of the rod;

a tubular sealing member made of rubber;

the sealing member having a tubular body having a straight tubular form in a free condition, a skirt portion, a head portion, and a plurality of annular portions, the cross sectional thickness of each annular portion in the radial direction being different from that of the tubular body;

the tubular body being slidably mounted on a second end portion of the rod;

the skirt portion being secured to the guide member;

the head portion being secured to the rod at an end of the second end portion of the rod; and the annular portion being so designed that the tubular body is automatically wrinkled to be contracted in the form of a bellows from the straight tubular form when the guide member is moved to the end of the rod.

2. A thermo-actuator according to claim 1 wherein the predetermined width of the gap is approximately equal to the thickness of the bag portion.

3. A thermo-actuator according to claim 1 wherein each of said annular portions is an annular groove formed in an inner wall of the tubular body.

4. A thermo-actuator according to claim 1 wherein the head portion of the sealing member has an annular rib on the inside wall thereof, and the first end portion of the rod has an annular groove in which the annular rib is engaged so that the sealing member is secured to the rod.

* * * * *